US012672041B2

(12) United States Patent
Bai et al.

(10) Patent No.: US 12,672,041 B2
(45) Date of Patent: Jun. 30, 2026

(54) SMART REPEATER DEVICE

(71) Applicant: QUALCOMM Incorporated, San Diego, CA (US)

(72) Inventors: Tianyang Bai, Somerville, NJ (US); Navid Abedini, Basking Ridge, NJ (US); Junyi Li, Fairless Hills, PA (US)

(73) Assignee: Qualcomm Incorporated, San Diego, CA (US)

( * ) Notice: Subject to any disclaimer, the term of this patent is extended or adjusted under 35 U.S.C. 154(b) by 307 days.

(21) Appl. No.: 18/460,332

(22) Filed: Sep. 1, 2023

(65) Prior Publication Data

US 2025/0081057 A1     Mar. 6, 2025

(51) Int. Cl.
*H04W 36/08*     (2009.01)
*H04W 36/00*     (2009.01)

(52) U.S. Cl.
CPC ....... *H04W 36/08* (2013.01); *H04W 36/0072* (2013.01)

(58) Field of Classification Search
CPC ............. H04B 7/15528; H04L 1/1614; H04W 56/001; H04W 72/23; H04W 74/002; H04W 74/0833; H04W 84/047
See application file for complete search history.

(56) References Cited

U.S. PATENT DOCUMENTS

| | | | |
|---|---|---|---|
| 2021/0037447 A1* | 2/2021 | Tarighat Mehrabani | ................... H04W 40/248 |
| 2021/0044412 A1 | 2/2021 | Li et al. | |
| 2021/0219199 A1 | 7/2021 | Zhang et al. | |
| 2021/0298069 A1* | 9/2021 | Abedini | ............. H04B 7/15528 |
| 2021/0306065 A1* | 9/2021 | Abedini | ............. H04B 7/15528 |
| 2023/0136005 A1* | 5/2023 | Back | ................... H04W 72/543 370/329 |
| 2024/0147328 A1* | 5/2024 | Kim | ..................... H04W 36/30 |
| 2025/0193694 A1* | 6/2025 | Kurita | .................. H04W 16/28 |

OTHER PUBLICATIONS

International Search Report and Written Opinion—PCT/US2024/040337—ISA/EPO—Oct. 31, 2024.
Qualcomm Incorporated: "L1/L2 Mobility-General Concepts and Configuration", 3GPP TSG-RAN WG2 Meeting #119-e, R2-2207340, 3rd Generation Partnership Project, Mobile Competence Centre, 650, Route Des Lucioles, F-06921 Sophia-Antipolis Cedex, France, vol. RAN WG2, No. Electronic, Aug. 15, 2022-Aug. 26, 2022, Aug. 8, 2022, 6 Pages, XP052260662, paragraphs [0001], [02.1], [02.6].

* cited by examiner

*Primary Examiner* — Awet Haile
(74) *Attorney, Agent, or Firm* — Harrity & Harrity, LLP

(57) ABSTRACT

Various aspects of the present disclosure generally relate to wireless communication. In some aspects, a repeater device may receive a detection configuration that is associated with autonomous detection of a transmission that is associated with a user equipment (UE). The repeater device may detect the transmission based at least in part on the detection configuration. The repeater device may transmit a detection indication that is based at least in part on detecting the transmission. Numerous other aspects are described.

15 Claims, 10 Drawing Sheets

600 →

710 — Receive a detection configuration that is associated with autonomous detection of a transmission that is associated with a user equipment (UE)

720 — Detect the transmission based at least in part on the detection configuration 730 — Transmit a detection indication that is based at least in part on detecting the transmission

700

810 Transmit, to a repeater device, a detection configuration that is associated with autonomous detection of a transmission that is associated with a user equipment (UE)

820 Receive a detection indication that indicates detection of the transmission

800

SMART REPEATER DEVICE

FIELD OF THE DISCLOSURE

Aspects of the present disclosure generally relate to wireless communication and to techniques and apparatuses for a smart repeater device.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a repeater device. The method may include receiving a detection configuration that is associated with autonomous detection of a transmission that is associated with a user equipment (UE). The method may include detecting the transmission based at least in part on the detection configuration. The method may include transmitting a detection indication that is based at least in part on detecting the transmission.

Some aspects described herein relate to a method of wireless communication performed by a network node. The method may include transmitting, to a repeater device, a detection configuration that is associated with autonomous detection of a transmission that is associated with a UE. The method may include receiving a detection indication that indicates detection of the transmission.

Some aspects described herein relate to an apparatus for wireless communication at a repeater device. The apparatus may include one or more memories and one or more processors coupled to the one or more memories. The one or more processors may be configured to receive a detection configuration that is associated with autonomous detection of a transmission that is associated with a UE. The one or more processors may be configured to detect the transmission based at least in part on the detection configuration. The one or more processors may be configured to transmit a detection indication that is based at least in part on detecting the transmission.

Some aspects described herein relate to an apparatus for wireless communication at a network node. The apparatus may include one or more memories and one or more processors coupled to the one or more memories. The one or more processors may be configured to transmit, to a repeater device, a detection configuration that is associated with autonomous detection of a transmission that is associated with a UE. The one or more processors may be configured to receive a detection indication that indicates detection of the transmission.

Some aspects described herein relate to a non-transitory computer-readable medium that stores a set of instructions for wireless communication by a repeater device. The set of instructions, when executed by one or more processors of the repeater device, may cause the repeater device to receive a detection configuration that is associated with autonomous detection of a transmission that is associated with a UE. The set of instructions, when executed by one or more processors of the repeater device, may cause the repeater device to detect the transmission based at least in part on the detection configuration. The set of instructions, when executed by one or more processors of the repeater device, may cause the repeater device to transmit a detection indication that is based at least in part on detecting the transmission.

Some aspects described herein relate to a non-transitory computer-readable medium that stores a set of instructions for wireless communication by a network node. The set of instructions, when executed by one or more processors of the network node, may cause the network node to transmit, to a repeater device, a detection configuration that is associated with autonomous detection of a transmission that is associated with a UE. The set of instructions, when executed by one or more processors of the network node, may cause the network node to receive a detection indication that indicates detection of the transmission.

Some aspects described herein relate to an apparatus for wireless communication. The apparatus may include means for receiving a detection configuration that is associated with autonomous detection of a transmission that is associated with a UE. The apparatus may include means for detecting the transmission based at least in part on the detection configuration. The apparatus may include means for transmitting a detection indication that is based at least in part on detecting the transmission.

Some aspects described herein relate to an apparatus for wireless communication. The apparatus may include means for transmitting, to a repeater device, a detection configuration that is associated with autonomous detection of a transmission that is associated with a UE. The apparatus may include means for receiving a detection indication that indicates detection of the transmission.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
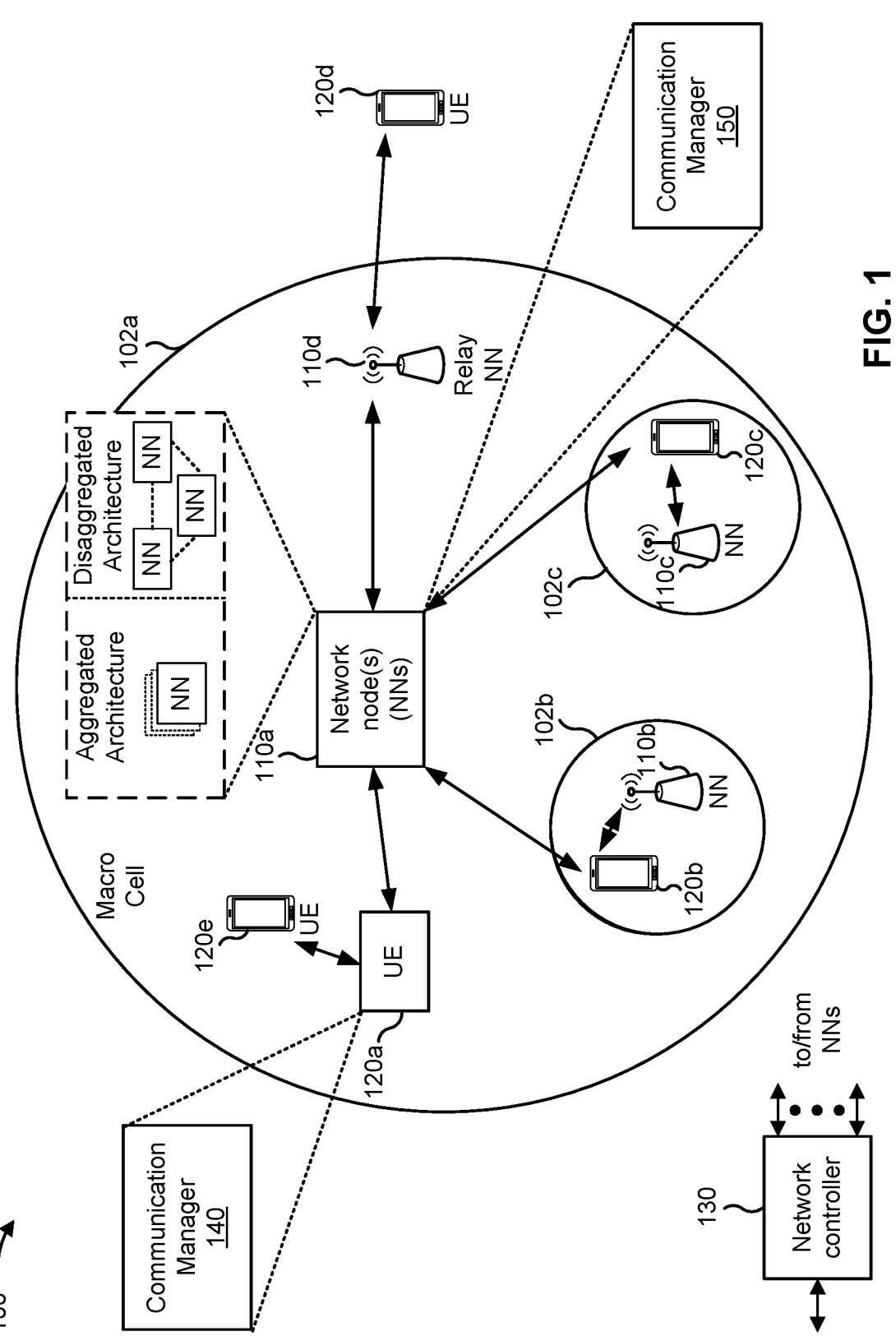
FIG. 1 is a diagram illustrating an example of a wireless network, in accordance with the present disclosure.

Beamforming and/or millimeter waves (mmWaves) may provide increased data throughput relative to lower frequencies when a transmitter operates in a line-of-sight (LoS) condition with a receiver, but may be more susceptible to disruption by an obstruction and/or blockage that obscures the LoS condition between the devices, such as a hand placed over an antenna, a building, or foliage, which may also result in increased recovery error at a receiver. Accordingly, some wireless links may include an intermediary device to mitigate the obstructions, such as a repeater device that amplifies and/or redirects pass-through signals. While a repeater device may be used for relaying mmWaves and/or beamformed signals, the repeater device may alternatively or additionally be used for signals in frequency bands that are different from mmWave frequency bands.

To illustrate, a repeater device may act as an intermediary device between a network node and a user equipment (UE), such as by repeating a downlink signal from the network node to the UE and/or by repeating an uplink signal from the UE to the network node. In some scenarios, the UE may autonomously transmit an uplink signal to the network node. Example scenarios may be associated with a conditional Layer 1/Layer 2 triggered mobility (LTM) procedure, such as a first scenario associated with the UE transmitting a cell switch request to a source network node and/or a second scenario associated with the UE transmitting an initial uplink transmission to a target network node. The use of one or more repeater devices in a conditional LTM may increase signaling overhead in a wireless network. For instance, a source network node may signal (e.g., to the repeater device)

dynamic configuration information that enables the repeater device to monitor for an asynchronous uplink transmission (e.g., a cell switch request) and/or indicates air interface resources allocated to the repeater device for forwarding the asynchronous uplink transmission. Alternatively, or additionally, a target network node may signal (e.g., to the repeater device) dynamic configuration information that enables the repeater device to monitor for an asynchronous uplink transmission (e.g., an initial uplink transmission) and/or indicates air interface resource allocations assigned to the repeater device for relaying the asynchronous uplink transmission. The iterative and/or periodic signaling of dynamic configuration information may increase signaling overhead between a network node and a repeater device, resulting in reduced data throughput and/or increased data transfer latencies in the wireless network as described above.

Various aspects described herein generally relate to a smart repeater device. Some aspects relate more specifically to a network node indicating configuration information to a repeater device using less signaling relative to signaling dynamic configuration information, and the configuration information may enable the repeater device to autonomously detect transmissions and/or relay transmissions. In some aspects, a repeater device may receive a detection configuration that is associated with autonomous detection of a transmission that is associated with a UE. For instance, the detection configuration may indicate one or more parameters that enable the repeater device to autonomously detect the transmission (e.g., an asynchronous uplink transmission). Based at least in part on the detection configuration, the repeater device may detect the transmission, such as a first transmission associated with a cell switch request and/or a second transmission associated with an initial uplink transmission. The repeater device may transmit a detection indication that is based at least in part on detecting the transmission.

In some aspect, a network node may transmit, to a repeater device, a detection configuration that is associated with autonomous detection of a transmission that is associated with a UE (e.g., an asynchronous transmission). In some aspects, the detection configuration may indicate one or more parameters that enable the repeater device to autonomously detect the transmission as described below. Based at least in part on transmitting the detection configuration, the network node may receive a detection indication that indicates detection of the transmission.

The detection configuration may enable a network node to reduce signaling overhead between the network node and a repeater device relative to signaling dynamic configuration information. For example, the network node may indicate (e.g., via a single detection configuration) one or more parameters that a repeater device may iteratively use to detect the asynchronous transmission, such as a configured grant (CG) physical uplink shared channel (PUSCH) configuration, a scrambling sequence, a UE identifier (ID), a UE group ID, and/or logical ID. Alternatively, or additionally, the detection configuration may indicate air interface resources allocated to the repeater device for autonomously relaying downlink transmissions, such as a semi-persistent scheduling (SPS) physical downlink shared channel (PDSCH) configuration that is allocated to the repeater device. Reducing the signaling overhead may preserve air interface resources for other uses, resulting in increased data throughput and/or reduced data transfer latencies in a wireless network.

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHZ), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a repeater device (e.g., a first UE) may include a communication manager 140. As described in more detail elsewhere herein, the communication manager 140 may receive a detection configuration that is associated with autonomous detection of a transmission that is associated with a UE (e.g., a second UE); detect the transmission based at least in part on the detection configuration; and transmit a detection indication that is based at least in part on detecting the transmission. Additionally, or alternatively, the communication manager 140 may perform one or more other operations described herein.

In some aspects, a network node (e.g., a network node 110) may include a communication manager 150. As described in more detail elsewhere herein, the communication manager 150 may transmit, to a repeater device, a detection configuration that is associated with autonomous detection of a transmission that is associated with a UE; and receive a detection indication that indicates detection of the transmission. Additionally, or alternatively, the communication manager 150 may perform one or more other operations described herein.

As indicated above, FIG. 1 is provided as an example. Other examples may differ from what is described with regard to FIG. 1.

Figure 2:
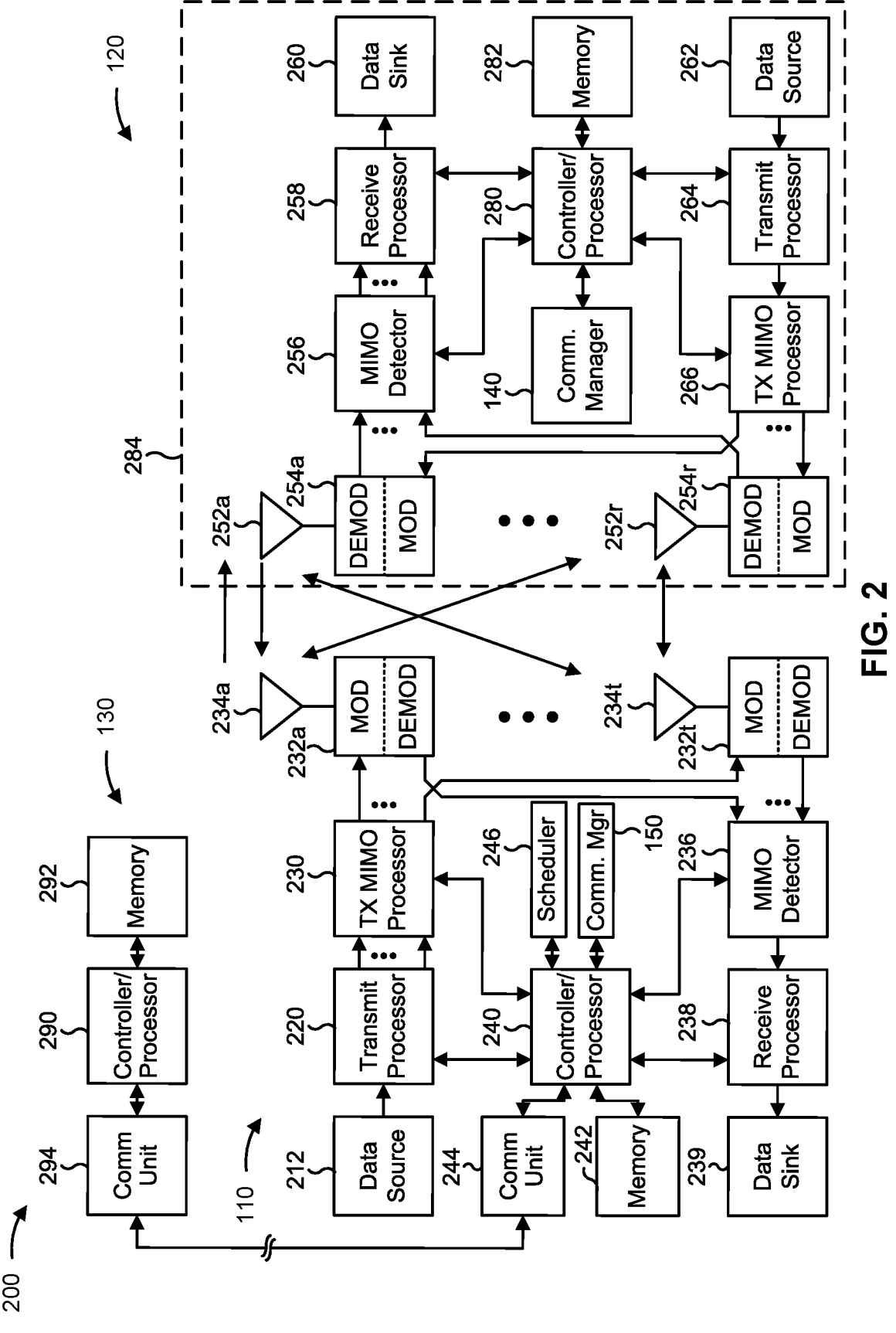
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-10).

The controller/processor 240 of the network node 110, the controller/processor 280 of the UE 120 (e.g., a repeater device and/or an apparatus 900), and/or any other component(s) of FIG. 2 may perform one or more techniques associated with a smart repeater device, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a repeater device (e.g., a first UE 120) includes means for receiving a detection configuration that is associated with autonomous detection of a transmission that is associated with a UE (e.g., a second UE 120); means for detecting the transmission based at least in part on the detection configuration; and/or means for transmitting a detection indication that is based at least in part on detecting the transmission. In some aspects, the means for the repeater device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., a network node 110) includes means for transmitting, to a repeater device, a detection configuration that is associated with autonomous detection of a transmission that is associated with a UE; and/or means for receiving a detection indication that indicates detection of the transmission. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
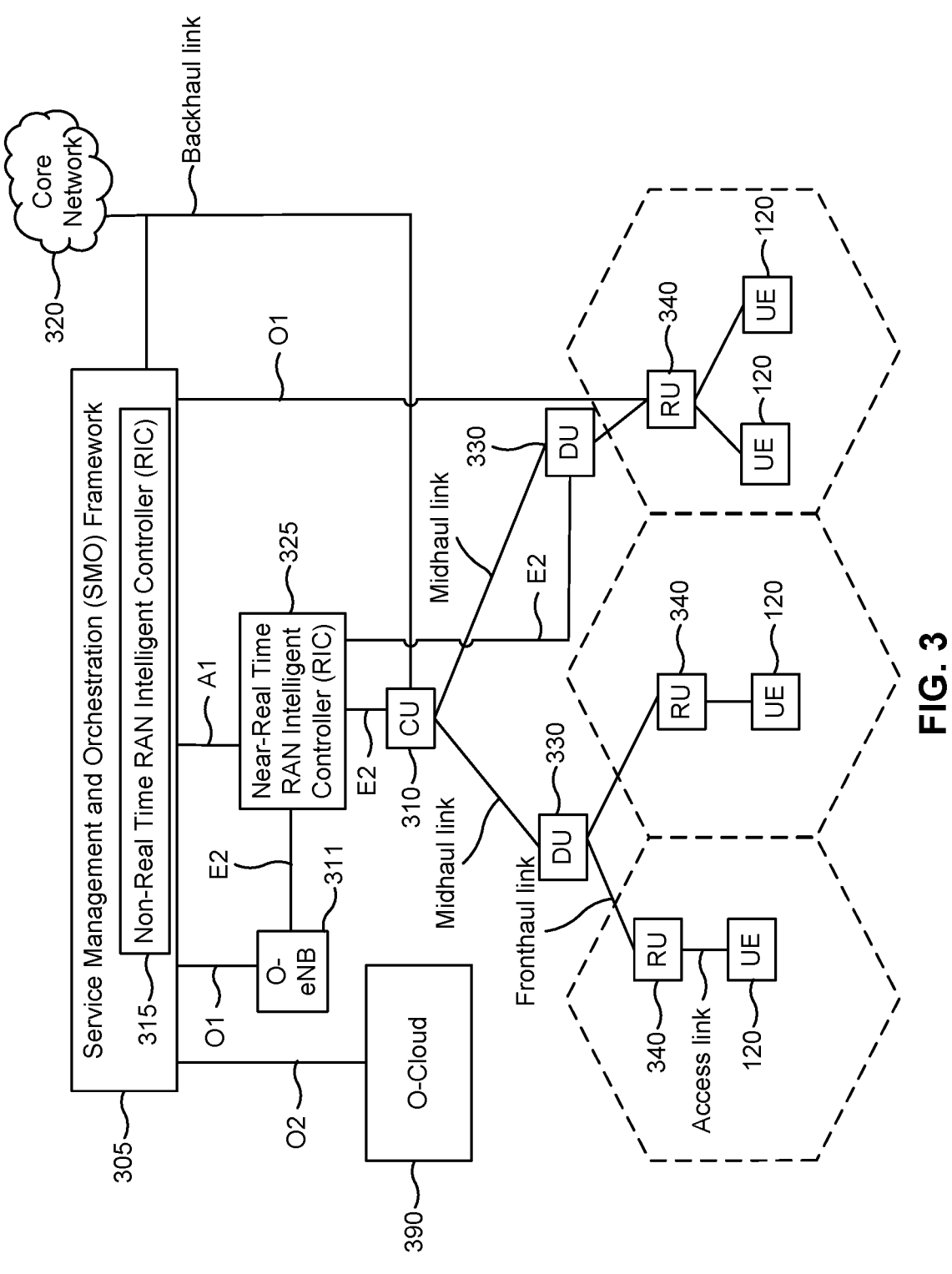
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
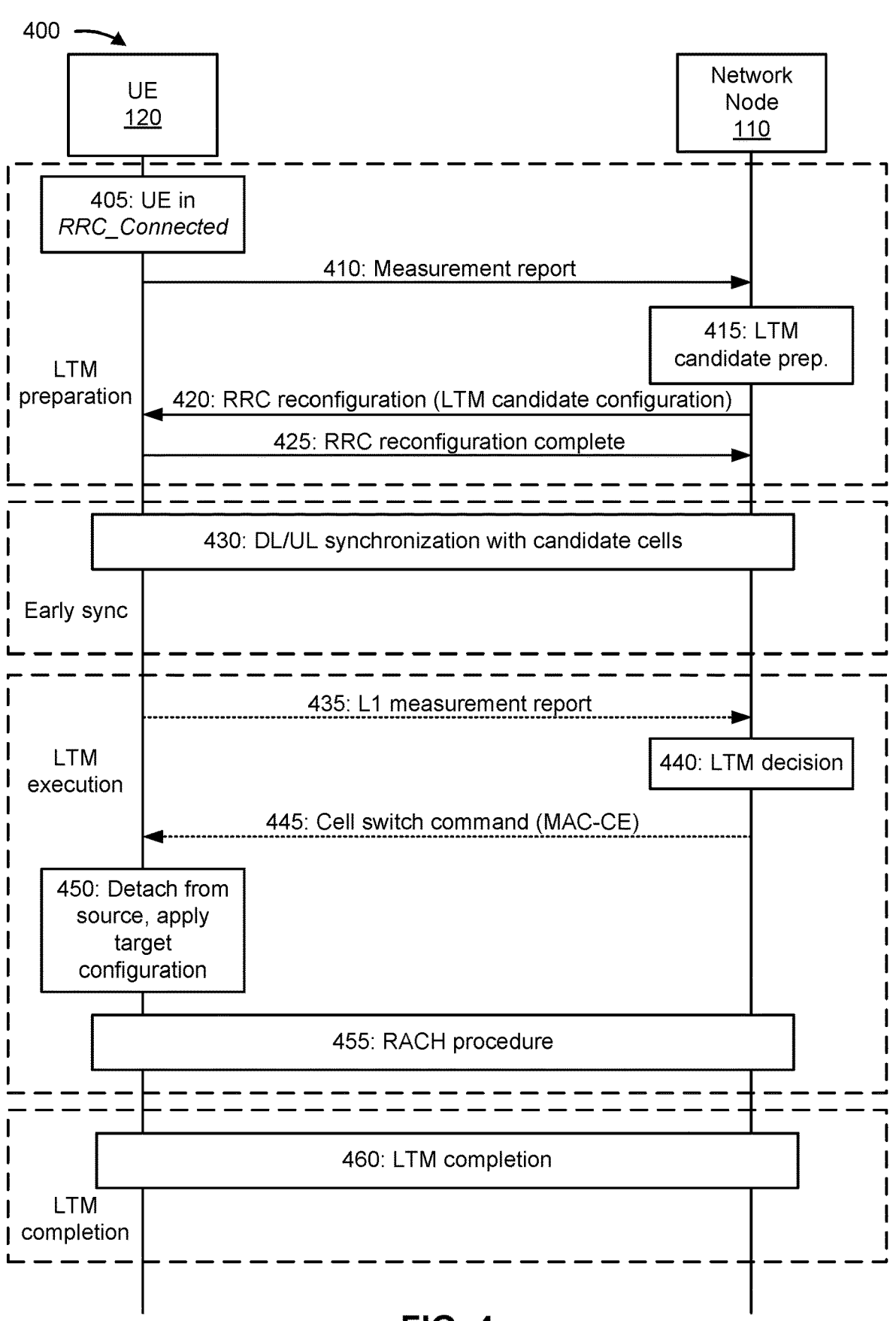
FIG. 4 is a diagram illustrating an example of a Layer 1/Layer 2 triggered mobility procedure, in accordance with the present disclosure.

FIG. 4 is a diagram illustrating an example 400 of a Layer 1/Layer 2 (L1/L2) triggered mobility (LTM) procedure, in accordance with the present disclosure.

In some examples, a network node 110 may instruct a UE 120 to change serving cells, such as when the UE 120 moves away from coverage of a current serving cell (sometimes referred to as a source cell) and towards coverage of a neighboring cell (sometimes referred to as a target cell). In some cases, the network node 110 may instruct the UE 120 to change cells using a layer 3 (L3) handover procedure. An L3 handover procedure may include the network node 110 transmitting, to the UE 120, an RRC reconfiguration message indicating that the UE 120 should perform a handover procedure to a target cell, which may be transmitted in response to the UE 120 providing the network node 110 with an L3 measurement report indicating signal strength measurements associated with various cells (e.g., measurements associated with the source cell and one or more neighboring cells). In response to receiving the RRC reconfiguration message, the UE 120 may communicate with the source cell and the target cell to detach from the source cell and connect to the target cell (e.g., the UE 120 may establish an RRC connection with the target cell). Once handover is complete, the target cell may communicate with a user plane function (UPF) of a core network to instruct the UPF to switch a user plane path of the UE 120 from the source cell to the target cell. The target cell may also communicate with the source cell to indicate that handover is complete and that the source cell may be released.

L3 handover procedures may be associated with high latency and high overhead due to the multiple RRC reconfiguration messages and/or other L3 signaling and operations used to perform the handover procedures. Accordingly, in some examples, a UE 120 may be configured to perform a lower-layer (e.g., L1 and/or L2) handover procedure, sometimes referred to an LTM procedure, such as the example 400 LTM procedure shown in FIG. 4. As shown in FIG. 4, the LTM procedure may include four phases: an LTM preparation phase, an early synchronization phase (shown as "early sync" in FIG. 4), an LTM execution phase, and/or an LTM completion phase.

During the LTM preparation phase, and as shown by reference number 405, the UE 120 may be in an RRC connected state (sometimes referred to as RRC_Connected) with a source cell. As shown by reference number 410, the UE 120 may transmit, and the network node 110 may receive, a measurement report (sometimes referred to as a MeasurementReport), which may be an L3 measurement report. The measurement report may indicate signal strength measurements (e.g., RSRP, RSSI, RSRQ, and/or CQI) or similar measurements associated with the source cell and/or one or more neighboring cells. In some examples, based at least in part on the measurement report or other information, the network node 110 may decide to use LTM, and thus, as shown by reference number 415, the network node 110 may initiate LTM candidate preparation.

As shown by reference number 420, the network node 110 may transmit, and the UE 120 may receive, an RRC reconfiguration message (sometimes referred to as an RRCReconfiguration message), which may include an LTM candidate configuration. More particularly, the RRC reconfiguration message may indicate a configuration of one or more LTM candidate target cells, which may be candidate cells to become a serving cell of the UE and/or cells for which the UE 120 may later be triggered to perform an LTM procedure. As shown by reference number 425, the UE 120 may store the configuration of the one or more LTM candidate cell configurations and, in response, may transmit, to the network node 110, an RRC reconfiguration complete message (sometimes referred to as an RRCReconfiguration-Complete message).

Alternatively, the network node 110 may indicate and/or configure the UE 120 with one or more conditions for a conditional LTM that is associated with the UE 120 initiating an LTM procedure. For example, the UE 120 may trigger an LTM procedure based at least in part on detecting that a condition has been satisfied. As one example, the network node 110 may indicate a condition that associated with a measurement metric (e.g., generated by the UE 120 measuring a reference signal (RS) that is associated with a candidate cell) satisfying a measurement threshold. Accordingly, the UE 120 may trigger a conditional LTM procedure based at least in part on an RS measurement satisfying the measurement threshold. In some aspects, the network node 110 may indicate an air interface resource allocation (e.g., a preconfigured air interface resource allocation) that may be used by the UE 120 to transmit a cell switch request as described below.

During the early synchronization phase, and as shown by reference number 430, the UE 120 may optionally perform downlink/uplink synchronization with the candidate cells associated with the one or more LTM candidate cell configurations. For example, the UE 120 may perform downlink synchronization and timing advance acquisition with the one or more candidate target cells prior to receiving an LTM switch command (which is described in more detail below in connection with reference number 445). In some aspects, performing the early synchronization with the one or more candidate cells may reduce latency associated with performing a random access channel (RACH) procedure later in the LTM procedure, which is described in more detail below in connection with reference number 455.

During the LTM execution phase, and as shown by reference number 435, the UE 120 may perform L1 measurements on the configured LTM candidate target cells, and thus may transmit, to the network node 110, lower-layer (e.g., L1) measurement reports. To illustrate, the network node 110 may instruct and/or configure the UE 120 to evaluate multiple LTM candidate target cells, to generate a respective measurement metric based at least in part on a respective RS transmitted by the LTM candidate target cell(s), and/or to report the transmission of the respective RS by the candidate target cell(s). As shown by reference number 440, based at least in part on the lower-layer measurement reports, the network node 110 may decide to execute an LTM cell switch to a target cell. Alternatively, or additionally, the UE 120 may indicate a request to perform a conditional LTM procedure. As a first example, based at least in part on detecting that a condition associated with a conditional LTM has been satisfied, the UE 120 may transmit a cell switch request via Layer 1 signaling (e.g., uplink control information (UCI)) and/or a Layer 2 signaling (e.g., a MAC control element (CE)). As a second example, the UE 120 may autonomously transmit Layer 1 signaling and/or Layer 2 signaling to a target cell that is associated with satisfying the condition. The autonomous Layer 1 signaling and/or the Layer 2 signaling to the target cell may be referred to as an initial UL transmission and/or an initial transmission and, in some aspects, the UE 120 may use preconfigured air interface resources for autonomous transmission of the initial UL transmission. For example, the UE 120 may use preconfigured RACH air interface resources that are associated with the target cell.

Accordingly, as shown by reference number 445, the network node 110 may transmit, and the UE 120 may receive, a MAC CE, downlink control information (DCI) and/or similar message triggering an LTM cell switch (the MAC CE or similar message is sometimes referred to herein as a cell switch command (CSC). The CSC may include an indication of a candidate configuration index associated with the target cell. In some aspects, the network node 110 may transmit the CSC based at least in part on receiving a cell switch request from the UE 120.

As shown by reference number 450, based at least in part on receiving the CSC, the UE 120 may switch to the configuration of the LTM candidate target cell (e.g., the UE 120 may detach from the source cell and apply the target cell configuration).

As shown by reference number 455, the UE 120 may perform a RACH procedure towards the target cell, such as when a timing advance associated with the target cell is not available (e.g., in examples in which the UE 120 did not perform the early synchronization as described above in connection with reference number 430).

In some aspects, the UE 120 may not receive a downlink communication from the target cell until after the UE 120 has transmitted an initial UL transmission to the target cell of the cell switch. That is, the target cell may not transmit a downlink communication to the UE 120 until the target cell receives the initial UL transmission from the UE 120. The initial UL transmission may be based at least in part on any combination of a RACH procedure as shown by FIG. 4, a physical uplink shared channel (PUSCH) transmission, a physical uplink control channel (PUCCH) transmission, and/or a sounding reference signal (SRS). In some aspects, the initial UL transmission may indicate UE ID information, such as through a RACH preamble or scrambling sequence (e.g., in an SRS and/or PUCCH transmission), and/or through a cell radio temporary identifier (C-RNTI) MAC CE in a PUSCH transmission.

During the LTM completion phase, and as shown by reference number 460, the UE 120 may indicate successful completion of the LTM cell switch towards the target cell. In this way, cell switch to a target cell may be performed using less overhead than for an L3 handover procedure and/or a cell switch to a target cell may be associated with reduced latency as compared to L3 handover procedure.

As indicated above, FIG. 4 is provided as an example. Other examples may differ from what is described with respect to FIG. 4.

Figure 5:
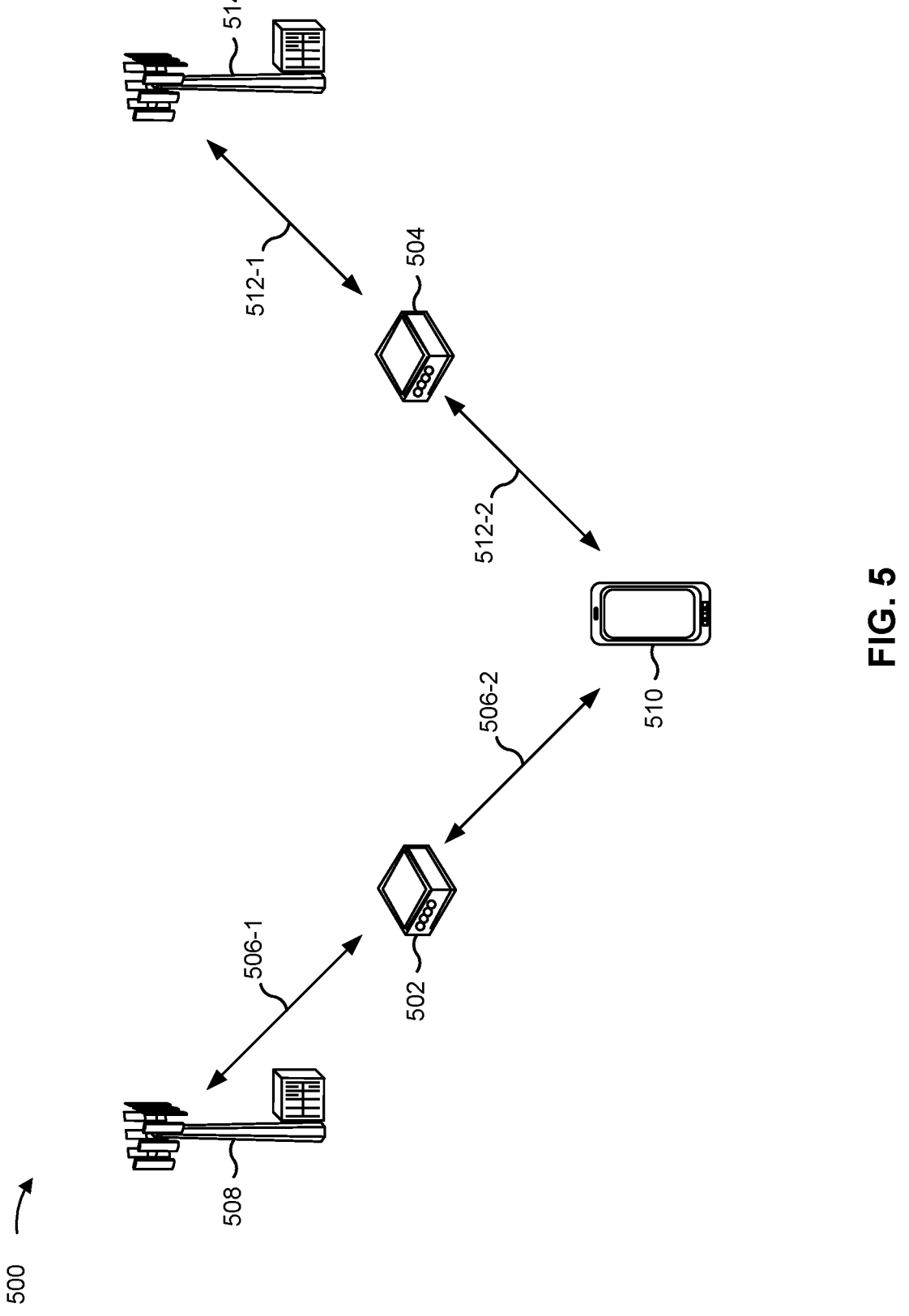
FIG. 5 is a diagram illustrating an example of a repeater device, in accordance with the present disclosure.

FIG. 5 is a diagram illustrating an example 500 of a repeater device, in accordance with the present disclosure.

In some aspects, a wireless communication system may use mmWaves to transmit information and/or data, such as a wireless communication system that is based at least in part on using the above-6-GHz frequencies associated with FR1 and/or FR2. While transmissions that use mmWaves (or higher) may enable a device to transmit or receive the information and/or data at a higher capacity (e.g., a higher data rate or increased data throughput) relative to lower frequencies, the higher frequencies and/or beam transmissions may be more susceptible to adverse channel conditions and/or blockages. As one example, a mmWave may observe increased recovery errors (relative to lower frequencies) based at least in part on a multipath associated with reflections. Some wireless communication systems may use beamforming at higher frequencies to improve a signal quality (e.g., increased power level), increase range and reliability, and/or reduce interference. To illustrate, a transmitter device may use multiple antennas to generate transmissions that constructively and/or destructively interfere with one another to generate a beamformed transmission that propagates in a desired direction and/or has increased signal strength in the desired direction. That is, beamforming may focus radio waves in a select direction and steer the antenna beams toward an intended receiver.

Beamforming and/or mmWaves may provide increased data throughput relative to lower frequencies when a transmitter operates in a line-of-sight (LoS) condition with a receiver, but may be more susceptible to disruption by an obstruction and/or blockage that obscures the LoS condition between the devices, such as a hand placed over an antenna, a building, or foliage, which may also result in increased recovery error at a receiver. Some operating environments, such as an indoor operating environment and/or an urban area, may include more obstructions that disrupt an LoS between a transmitter and a receiver. Accordingly, some wireless links may include an intermediary device to mitigate the obstructions, such as a repeater device that amplifies and/or redirects pass-through signals. "Pass-through signal" may denote a signal that is received by a repeater device, amplified by the repeater device, and/or redirected by the repeater device without alterations to content and/or information carried by the pass-through signal. That is, the information and/or content carried by the pass-through signal may be directed to a different recipient than the repeater device, and the repeater device may modify transmission properties of the pass-through signal to improve reception of the pass-through signal by the intended recipient (e.g., by amplifying the signal and/or changing a propagation direction to an LoS propagation direction between the repeater device and a receiver). The use of a repeater device may be associated with one or more operating conditions, such as a latency condition (e.g., to mitigate inter-symbol interference that is associated with a channel delay spread that is greater than a cyclic prefix length), a coverage area condition, and/or a simultaneous support condition (e.g., a number of UEs supported by the repeater device at one time). While a repeater device may be used for relaying mmWaves and/or beamformed signals, the repeater device may alternatively or additionally be used for signals in frequency bands that are different from mmWave frequency bands.

The example 500 includes a first repeater device 502 and a second repeater device 504 that may each, in some cases, be implemented as a respective UE 120. In some aspects, the first repeater device 502 and/or the second repeater device 504 may support modifying transmission parameters (e.g., a power level and/or propagation direction) of one or more pass-through signals (e.g., simultaneously). For instance, and as shown by reference number 506-1 and reference number 506-2, the first repeater device 502 may repeat a downlink signal from a first network node 508 that is directed to a UE 510. Alternatively, or additionally, the first repeater device 502 may repeat an uplink signal from the UE 510 to the first network node 508. As another example, and as shown by reference number 512-1 and reference number 512-2, the second repeater device 504 may repeat a downlink signal from a second network node 514 that is directed to the UE 510. Alternatively, or additionally, the second repeater device 504 may repeat an uplink signal from the UE 510 to the second network node 514.

Aspects of the example 500 may be used in a variety of scenarios. One scenario includes a conditional LTM procedure as described with regard to FIG. 4. To illustrate, the first network node 508 may be a source network node that provides a source cell and/or service to the UE 510, and the second network node 514 may be a candidate network node and/or target network node (e.g., a candidate target cell) evaluated by the UE 510 and/or is a target of a handover. The use of one or more repeater devices in a conditional LTM may increase signaling overhead in a wireless network, resulting in reduced data throughput and/or increased data transfer latencies in the wireless network.

To illustrate, based at least in part on acting as a source network node to the UE 510, the first network node 508 may establish a first wireless connection with the UE 510 and a second wireless connection with the first repeater device 502. The first network node 508 may signal dynamic configuration information to the first repeater device 502 (e.g., via the second wireless connection) that enables the first repeater device 502 to monitor for an asynchronous uplink transmission associated with the first wireless connection and/or the UE 510. For instance, and as described above, the UE 510 may transmit (e.g., via the first wireless connection) a cell switch request to the first network node 508 to trigger a conditional LTM procedure. To enable the first repeater device 502 to detect the cell switch request, the first network node 508 may iteratively and/or periodically signal dynamic configuration information that indicates air interface resources that may be used by the UE 510 to transmit the cell switch request. Alternatively, or additionally, the first network node 508 may iteratively and/or repeatedly signal dynamic configuration information that indicates air interface resources allocated to the first repeater device 502 for forwarding the cell switch request transmission.

Based at least in part on acting as a target network node to the UE 510, the second network node 514 may establish a third wireless connection with the second repeater device 504, and may signal dynamic configuration information to the second repeater device 504 via the third wireless connection, such as configuration information that enables the second repeater device 504 to monitor for an asynchronous uplink transmission by the UE 510, to monitor for a downlink transmission by the second network node 514, enables the second repeater device 504 to relay the downlink transmission, and/or enables the second repeater device 504 to relay the asynchronous uplink transmission. As one example, the second network node 514 may iteratively and/or periodically signal dynamic configuration information assigned to the second repeater device 504 for relaying a DL RS from the second network node 514 to the UE 510. As another example, the second network node 514 may iteratively and/or periodically signal dynamic configuration information that indicates air interface resources that are associated with detecting an asynchronous initial UL transmission by the UE 510 (e.g., an initial UL transmission that is part of a conditional LTM procedure). In some aspects, the second network node 514 may signal dynamic configuration information that indicates air interface resources that are assigned to the second repeater device 504 to relay the initial UL transmission to the second network node 514. The iterative and/or periodic signaling of dynamic configuration information may increase signaling overhead between a network node and a repeater device, resulting in reduced data throughput and/or increased data transfer latencies in the wireless network, as described above.

Some techniques and apparatuses described herein provide a smart repeater device. In some aspects, a repeater device may receive a detection configuration that is associated with autonomous detection of a transmission that is associated with a UE. That is, the detection configuration may indicate one or more parameters that enable the repeater device to autonomously detect the transmission (e.g., an asynchronous uplink transmission). Based at least in part on the detection configuration, the repeater device may detect the transmission, such as a first transmission associated with a cell switch request and/or a second transmission associated with an initial uplink transmission. The repeater device may transmit a detection indication that is based at least in part on detecting the transmission.

In some aspects, a network node may transmit, to a repeater device, a detection configuration that is associated with autonomous detection of a transmission that is associated with a UE (e.g., an asynchronous transmission). In some aspects, the detection configuration may indicate one or more parameters that enable the repeater device to autonomously detect the transmission as described below. Based at least in part on transmitting the detection configuration, the network node may receive a detection indication that indicates detection of the transmission.

A network node may indicate a detection configuration to a repeater device that enables the repeater device to detect asynchronous messages generated by a UE, such as a cell switch request message that is associated with an LTM procedure and/or an initial uplink transmission that is associated with the LTM procedure. In some aspects, the detection configuration may enable a network node to reduce signaling overhead between the network node and a repeater device relative to signaling dynamic configuration information. For example, the network node may indicate (e.g., via a single detection configuration) one or more parameters that a repeater device may iteratively use to detect the asynchronous transmission and/or relay the asynchronous transmission, such as a CG PUSCH configuration, a scrambling sequence, a UE ID, a UE group ID, and/or logical ID. To illustrate, the repeater device may detect the asynchronous transmission based at least in part on a scrambling sequence and/or may relay the asynchronous transmission based at least in part on the CG PUSCH configuration. Alternatively, or additionally, the detection configuration may indicate air interface resources allocated to the repeater device for autonomously relaying downlink transmissions, such as an SPS PDSCH configuration that is allocated to the repeater device. Reducing the signaling overhead may preserve air interface resources for other uses, resulting in increased data throughput and/or reduced data transfer latencies in a wireless network.

As indicated above, FIG. 5 is provided as an example. Other examples may differ from what is described with regard to FIG. 5.

Figure 6:
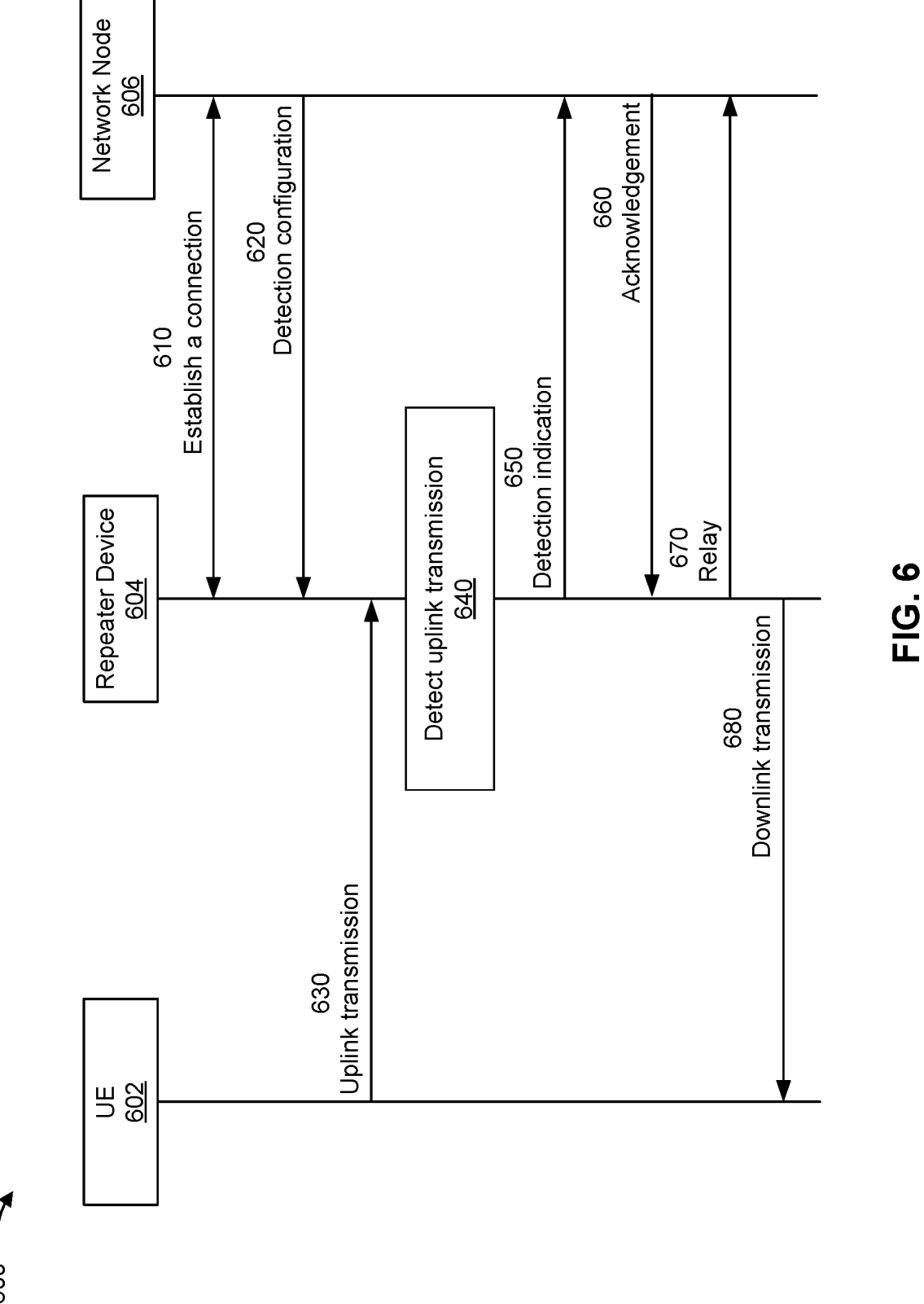
FIG. 6 is a diagram illustrating an example of a wireless communication process between a UE, a repeater device, and a network node, in accordance with the present disclosure.

FIG. 6 is a diagram illustrating an example 600 of a wireless communication process between a UE 602 (e.g., a UE 120), a repeater device 604 (e.g., another UE 120 and/or an apparatus 900), and a network node 606 (e.g., a network node 110 and/or an apparatus 1000), in accordance with the present disclosure. In some aspects, the network node 606 may be a source network node that provides service to the UE 602, such as the first network node 508 as described with regard to FIG. 5. Alternatively, or additionally, the network node 606 may be a target network node that is associated with an LTM procedure, such as the second network node 514 as described with regard to FIG. 5.

As shown by reference number 610, a repeater device 604 may establish a connection with a network node 606, such as a wireless connection and/or a wired connection. To illustrate, the repeater device 604 may be an instance of a UE 120 that powers up in a cell coverage area provided by the network node 606, and the repeater device 604 and the network node 606 may perform one or more procedures (e.g., a RACH procedure and/or an RRC procedure) to establish a wireless connection. Alternatively, or additionally, the network node 606 and the repeater device 604 may communicate via the connection based at least in part on any combination of Layer 1 signaling (e.g., downlink control information (DCI) and/or uplink control information (UCI)), Layer 2 signaling (e.g., a MAC control element (CE)), and/or Layer 3 signaling (e.g., RRC signaling). To illustrate, the network node 606 may request, via RRC signaling, capability information, and/or the repeater device 604 may transmit, via RRC signaling, the capability information. As part of communicating via the connection, the network node 606 may transmit configuration information via Layer 3 signaling (e.g., RRC signaling), and activate and/or deactivate a particular configuration via Layer 2 signaling (e.g., a MAC CE) and/or Layer 1 signaling (e.g., DCI). For instance, the network node 606 may transmit the configuration information via Layer 3 signaling at a first point in time associated with the repeater device 604 being tolerant of communication delays, and the network node 606 may transmit an activation of the configuration via Layer 2 signaling and/or Layer 1 signaling at a second point in time associated with the repeater device 604 being intolerant to communication delays.

Alternatively, or additionally, the repeater device 604 may act as an intermediary device that amplifies and/or redirects one or more pass-through signals between the network node 606 and the UE 602. To illustrate, the network node 606 may communicate with the repeater device 604 using a first wireless connection between the repeater device 604 and the network node 606, and the repeater device 604 may amplify, redirect, and/or relay pass-through signals that are associated with a second wireless connection between the network node 606 and the UE 602. The repeater device 604 may act as an intermediary device between a source network node and a UE and/or as an intermediary device between a target network node and the UE.

As shown by reference number 620, the network node 606 may transmit, and the repeater device 604 may receive, an indication of a detection configuration that is associated with autonomous detection of a transmission that is associated with the UE 602. As one example, the network node 606 may transmit the indication of the detection configuration using a wireless connection and/or a wired connection between the network node 606 and the repeater device 604. In some aspects, the detection configuration may indicate one or more parameters associated with detecting a transmission by the UE 602. That is, the detection configuration may indicate information that may enable the repeater device 604 to detect an uplink transmission by the UE 602. Some non-limiting examples of parameters may include an air interface resource associated with the transmission and/or UE ID information (e.g., a UE ID that may be used during at least part of an LTM procedure). For instance, the detection configuration may indicate any combination of a UE ID, a UE group ID, and/or a logical ID associated with and/or indicated by an LTM procedure. Alternatively, or additionally, the detection configuration may indicate a sequence that is assigned to the UE 602, such as a scrambling sequence that may be used to identify, detect, and/or validate a presence of an uplink transmission by the UE 602. In some aspects, the detection configuration may indicate, as the air interface resource, a first air interface resource assigned to the UE 602 for an uplink communication (e.g., a cell switch request) and/or a second air interface resource that is allocated to one or more RACH transmissions to the network node 606. In some aspects, the network node 606 may configure the repeater device 604 to iteratively and/or periodically receive, detect, and/or decode an uplink transmission on preconfigured resources, such as by indicating a CG. Accordingly, the network node 606 may configure the repeater device 604 to iteratively monitor for an uplink transmission using less overhead signal relative to dynamic configuration information.

In some aspects, the network node 606 may indicate and/or assign an air interface resource (e.g., via the detection configuration and/or other messaging) to the repeater device 604. To illustrate, the network node 606 may indicate a CG PUSCH configuration that is assigned to the repeater device 604 for transmissions to the network node 606, such as autonomous uplink transmissions to the network node 606 (e.g., a detection indication and/or a relayed uplink transmission). Alternatively or additionally, the network node 606 may indicate an SPS PDSCH configuration that is assigned to the repeater device 604 for relaying downlink transmissions to the UE 602 (e.g., a downlink RS). Accordingly, in some aspects, the network node 606 may preconfigure an air interface resource allocation that is assigned to the repeater device 604 for downlink transmissions and/or uplink transmissions. While the example 600 describes the network node 606 transmitting the CG PUSCH configuration and/or the SPS PDSCH configuration as part of initializing the repeater device 604 for communications with the UE 602, other examples may include the network node 606 transmitting the CG PUSCH configuration and/or the SPS PDSCH configuration based at least in part on receiving an allocation request from the repeater device 604 as described below.

The network node 606 may transmit, as part of the detection indication and/or separate from the detection indication, reference signal configuration information that is associated with the repeater device 604 generating and/or transmitting a downlink RS. To illustrate, the network node 606 may act as a target network node that the UE 602 evaluates based at least in part on measurements associated with an RS. In some aspects, and as described with regard to reference number 680, the network node 606 may configure the repeater device 604 to autonomously generate and/or transmit the RS based at least in part on reference signal configuration information. Some non-limiting examples of information indicated by the reference signal configuration information may include any combination of an air interface resource configuration that may be used for transmission of the reference signal, a codebook that may be used for transmission of the reference signal, and/or a scrambling sequence associated with transmission of the reference signal.

As shown by reference number 630, the UE 602 may transmit, and the repeater device 604 may receive, an uplink transmission. As one example, the uplink transmission may be a PUCCH transmission, a PUSCH transmission, and/or a RACH transmission. Alternatively, or additionally, the uplink transmission may be a cell switch request and/or an initial uplink transmission associated with the UE 602 as described with regard to FIG. 4. To illustrate, the UE 602 may autonomously transmit a cell switch request to a source network node as part of an LTM procedure and/or to request to perform a handover. As another example, the UE 602 may transmit an initial uplink transmission to a target network node as part of an LTM procedure, such as a RACH transmission.

As shown by reference number 640, the repeater device 604 may detect the uplink transmission based at least in part on the detection configuration. For instance, the repeater device 604 may tune a receiver to a frequency band that is associated with an air interface resource indicated by the detection configuration. Alternatively, or additionally, the repeater device 604 may validate and/or invalidate transmissions received by the receiver based at least in part on a time span (e.g., a slot, a mini-slot, and/or a symbol) associated with the air interface resource, such as by validating a first transmission that is received within the time span and/or invalidating a second transmission that is received outside of the time span. In some aspects, the repeater device may detect a presence of a transmission based at least in part on using energy detection (e.g., a received power level satisfies a power threshold). Alternatively, or additionally, the repeater device 604 may detect a presence of the transmission and/or validate the transmission based at least in part on sequence detection and/or uplink decoding (e.g., PUCCH decoding and/or PUSCH decoding). For example, the repeater device 604 may at least partially decode a PUCCH transmission and/or a PUSCH transmission to validate whether the transmission includes particular information (e.g., a UE ID, a scrambling sequence, and/or a cell switch request decoded from a payload of a PUCCH transmission and/or a PUSCH transmission) and, subsequently, validate the transmission based at least in part on a presence (or lack of presence) of the particular information in the transmission. In some aspects, the repeater device may detect that the uplink transmission is associated with an LTM procedure (e.g., an LTM procedure that is associated with the UE 602), such as by validating a message type (e.g., a cell switch request message) and/or validating a RACH transmission.

As shown by reference number 650, the repeater device 604 may transmit, and the network node 606 may receive, a detection indication. The detection indication may be an explicit indication or an implicit indication. For example, the repeater device 604 may relay the detected transmission from the UE 602, and the relayed transmission may implicitly indicate detection of the transmission. As another example, the repeater device 604 may transmit and/or signal an explicit message that is associated with indicating detection of the transmission. The repeater device 604 may transmit the detection indication based at least in part on using preconfigured air interface resources (e.g., a CG) and/or based at least in part on dynamically allocated resources as described below. The detection indication may specify and/or indicate any combination of a UE ID that is associated with a handover event (e.g., an LTM procedure), a UE group ID that is associated with the handover event, and/or a logical ID that is associated with the handover event.

In some aspects, the repeater device 604 may act as an intermediary device between a source network node and a UE (e.g., the network node 606 and the UE 602, respectively). As described with regard to reference number 640, the repeater device may detect that the transmission is associated with an LTM procedure associated with the UE 602, such as by detecting that the transmission indicates a cell switch request, and the repeater device 604 may transmit the detection indication to the source network node based at least in part on detecting that the transmission is associated with the LTM procedure. That is, detecting that the transmission is associated with the LTM procedure may be a trigger event for transmitting the detection indication.

Alternatively, or additionally, the repeater device 604 may act as an intermediary device between a target network node and the UE (e.g., the network node 606 and the UE 602, respectively). As described with regard to reference number 640, the repeater device may detect that the transmission is associated with an LTM procedure associated with the UE 602 and/or that the transmission is an initial uplink transmission by the UE 602 that is directed to the target network node, such as by detecting that the transmission is based at least in part on RACH air interface resources. Based at least in part on detecting that the transmission is an initial uplink transmission, the repeater device 604 may transmit the detection indication.

In some aspects, the repeater device 604 may implicitly indicate detection of the transmission by transmitting a request for an uplink allocation assigned to the repeater device 604 (e.g., a request for one or more dynamically allocated resources). For instance, the repeater device 604 may transmit a scheduling request (SR) to the network node 606 for a dynamic uplink allocation to relay the uplink transmission associated with the UE 602. However, in other examples, the repeater device 604 may have access to preconfigured air interface resources as described above.

As shown by reference number 660, the network node 606 may transmit, and the repeater device 604 may receive, an acknowledgement indication that is associated with the detection indication. The acknowledgement indication may be an explicit acknowledgement indication and/or may be an implicit acknowledgement indication. For example, an implicit acknowledgement indication may include the network node 606 transmitting an allocation assignment to the repeater device 604 that is based at least in part on an SR from the repeater device 604. That is, the network node 606 may transmit an allocation indication that indicates an uplink allocation to the repeater device 604 (and/or the UE 602), and the repeater device 604 may interpret the allocation indication as an acknowledgment indication. As another example, an explicit acknowledgement indication may include an acknowledgement message and/or acknowledgement signaling that includes a field that is set to a value that explicitly indicates an acknowledgement.

In some aspects, the repeater device 604 may delay performing one or more operations that are associated with the detected transmission until receipt of the acknowledgement indication. For example, and as described below with regard to reference number 670, the repeater device 604 may delay relaying one or more uplink transmissions to the network node 606. Alternatively, or additionally, the repeater device 604 may delay transmitting a downlink transmission to the UE 602 until receipt of the acknowledgement indication. In some aspects, such as in a scenario associated with the repeater device 604 acting as an intermediary device between a source network node and the UE 602, the repeater device 604 may refrain from ceasing to generate, forward, and/or relay downlink transmissions to the UE 602. That is, the repeater device 604 may delay stopping the act of forwarding and/or relaying downlink transmissions to the UE 602 until receipt of the acknowledgement, and may stop forwarding and/or relaying downlink transmissions based at least in part on receiving the acknowledgement.

While the network node 606 transmits an acknowledgement indication in the example 600, other examples may include the network node 606 not transmitting an acknowledgement indication. Alternatively, or additionally, other examples may include the repeater device 604 proceeding with performing the one or more operations without delay.

As shown by reference number 670, the repeater device 604 may transmit, and the network node 606 may receive, a relayed transmission that is based at least in part on the uplink transmission received from the UE 602. For example, the repeater device 604 may proceed with relaying the uplink transmission based at least in part on receiving the acknowledgement indication. That is, relaying the uplink transmission may be an operation that the repeater device 604 delays performing as described with regard to reference number 660. To illustrate, the repeater device 604 may forward and/or relay one or more CG PUSCH transmissions based at least in part on preconfigured air interface resources as described above.

While the example 600 includes the repeater device 604 forwarding one or more uplink transmissions to the network node 606, other examples may include the repeater device 604 relaying one or more downlink transmissions to the UE 602 (e.g., instead of relaying an uplink transmission and/or in combination with relaying an uplink transmission). To illustrate, the repeater device 604 may forward and/or relay one or more SPS PDSCH transmissions based at least in part on preconfigured air interface resources, such as the one or more downlink transmissions as described with regard to reference number 680.

As shown by reference number 680, the repeater device 604 may transmit, and the UE 602 may receive, one or more downlink transmissions. As one example, the network node 606 may act as a target network node for the UE 602 and, based at least in part on detecting that the uplink transmission is an initial uplink transmission as described with regard to reference number 640, the repeater device may transmit an activation indication that is associated with activating a configuration at the UE 602 (e.g., a preconfigured air interface resource that is assigned to the UE 602 and/or an RS configuration that is associated with the UE 602). In some aspects, the repeater device 604 may autonomously activate the configuration associated with the UE 602 (e.g., without receiving an instruction from the network node 606). As one non-limiting example, the repeater device 604 may autonomously activate an RS configuration that is associated with a channel state information (CSI) RS configuration that the UE 602 may use to generate CSI metrics.

Alternatively, or additionally, the repeater device 604 may generate and/or transmit an RS (e.g., iteratively, periodically, and/or asynchronously). That is, the repeater device 604 may generate an RS transmission instead of relaying an RS transmission generated by the network node 606. To illustrate, the repeater device 604 may autonomously generate and/or transmit the RS based at least in part on reference signal configuration information as described above. In some aspects, the repeater device 604 may generate the RS based at least in part on a codebook and/or a scrambling sequence that is indicated by the reference signal configuration information. For example, the codebook may indicate a beam configuration to use for transmitting the RS, and the repeater device 604 may transmit the RS based at least in part on using a beam that is associated with the beam configuration. Alternatively, or additionally, the repeater device 604 may autonomously select the codebook to use for generating and/or transmitting the RS. In some aspects, the repeater device 604 may transmit the RS based at least in part on using one or more air interface resources configured and/or indicated by the network node 606.

A network node may indicate a detection configuration to a repeater device that enables the repeater device to detect asynchronous messages generated by a UE, such as a cell switch request message that is associated with an LTM procedure and/or an initial uplink transmission that is associated with the LTM procedure. In some aspects, the detection configuration may enable a network node to reduce signaling overhead between the network node and a repeater device relative to signaling dynamic configuration information. Reducing the signaling overhead may preserve air interface resources for other uses, resulting in increased data throughput and/or reduced data transfer latencies in a wireless network.

As indicated above, FIG. 6 is provided as an example. Other examples may differ from what is described with regard to FIG. 6.

Figure 7:
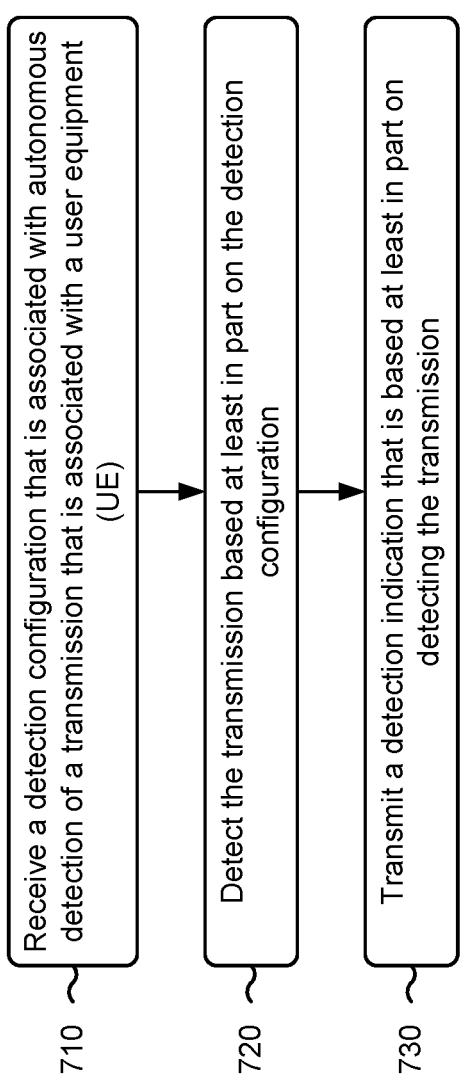
FIG. 7 is a diagram illustrating an example process performed, for example, at a repeater device or an apparatus of a repeater device, in accordance with the present disclosure.

FIG. 7 is a diagram illustrating an example process 700 performed, for example, at a repeater device or an apparatus of a repeater device, in accordance with the present disclosure. Example process 700 is an example where the apparatus or the repeater device (e.g., a UE 120 and/or apparatus 900) performs operations associated with a smart repeater device.

As shown in FIG. 7, in some aspects, process 700 may include receiving a detection configuration that is associated with autonomous detection of a transmission that is associated with a UE (block 710). For example, the repeater device (e.g., using reception component 902 and/or communication manager 906, depicted in FIG. 9) may receive a detection configuration that is associated with autonomous detection of a transmission that is associated with a UE, as described above.

As further shown in FIG. 7, in some aspects, process 700 may include detecting the transmission based at least in part on the detection configuration (block 720). For example, the repeater device (e.g., using reception component 902 and/or communication manager 906, depicted in FIG. 9) may detect the transmission based at least in part on the detection configuration, as described above.

As further shown in FIG. 7, in some aspects, process 700 may include transmitting a detection indication that is based at least in part on detecting the transmission (block 730). For example, the repeater device (e.g., using transmission component 904 and/or communication manager 906, depicted in FIG. 9) may transmit a detection indication that is based at least in part on detecting the transmission, as described above.

Process 700 may include additional aspects, such as any single aspect or any combination of aspects described below and/or in connection with one or more other processes described elsewhere herein.

In a first aspect, detecting the transmission includes detecting the transmission based at least in part on at least one of energy detection, sequence detection, or uplink decoding.

In a second aspect, the detection configuration indicates at least one of an air interface resource associated with the transmission, or UE ID information that is associated with the transmission.

In a third aspect, the transmission is an uplink transmission.

In a fourth aspect, the uplink transmission includes at least one of a PUCCH transmission, a PUSCH transmission, a cell switch request, or an initial uplink transmission associated with the UE.

In a fifth aspect, transmitting the detection indication includes relaying the transmission.

In a sixth aspect, process 700 includes detecting an event trigger, and transmitting the detection indication is based at least in part on detecting the event trigger.

In a seventh aspect, process 700 includes detecting that the transmission is an initial uplink transmission associated with the UE, and transmitting an activation indication that is associated with a configuration assigned to the UE.

In an eighth aspect, the configuration includes at least one of a reference signal configuration, a CG PUSCH configuration, or an SPS PDSCH configuration. The CG PUSCH configuration and/or the SPS PUSCH configuration may be assigned to the repeater device for relaying one or more signals.

In a ninth aspect, process 700 includes relaying at least one of a PUSCH transmission based at least in part on the CG PUSCH configuration, or a PDSCH transmission based at least in part on the SPS PDSCH configuration.

In a tenth aspect, process 700 includes receiving reference signal configuration information, and transmitting a reference signal based at least in part on the reference signal configuration information.

In an eleventh aspect, the reference signal configuration information indicates an air interface resource configuration associated with the reference signal.

In a twelfth aspect, the reference signal configuration information indicates a codebook associated with the reference signal.

In a thirteenth aspect, process 700 includes selecting, autonomously, a codebook to use for transmitting the reference signal.

In a fourteenth aspect, the reference signal configuration information indicates a scrambling sequence associated with the reference signal.

In a fifteenth aspect, the transmission is associated with an LTM procedure.

In a sixteenth aspect, process 700 includes detecting that the transmission is an initial uplink transmission associated with the UE, transmitting, to a network node, a request for an uplink allocation, and receiving, from the network node, an allocation indication that indicates the uplink allocation.

In a seventeenth aspect, transmitting the detection indication is based at least in part on the uplink allocation.

In an eighteenth aspect, the network node is associated with a target cell of the UE.

In a nineteenth aspect, the detection indication indicates at least one of a UE ID associated with a handover event, a UE group ID associated with the handover event, or a logical ID associated with the handover event.

In a twentieth aspect, process 700 includes delaying one or more operations associated with the transmission, receiving an acknowledgement indication that is associated with the detection indication, and performing, based at least in part on receiving the acknowledgement indication, the one or more delayed operations.

In a twenty-first aspect, process 700 includes detecting that the transmission is associated with an LTM procedure associated with the UE, and transmitting the detection indication includes transmitting the detection indication to a source network node associated with the UE based at least in part on detecting that the transmission is associated with the LTM procedure.

In a twenty-second aspect, process 700 includes delaying one or more operations associated with the transmission, receiving, from the source network node, an acknowledgement indication that is associated with the detection indication, and performing, based at least in part on receiving the acknowledgement indication, the one or more delayed operations.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
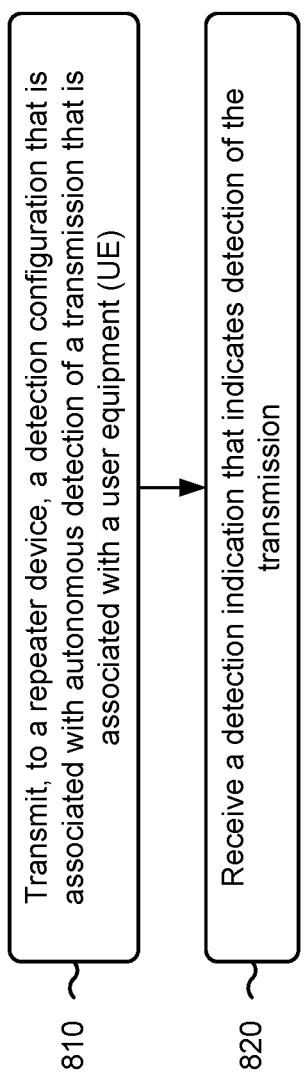
FIG. 8 is a diagram illustrating an example process performed, for example, at a network node or an apparatus of a network node, in accordance with the present disclosure.

FIG. 8 is a diagram illustrating an example process 800 performed, for example, at a network node or an apparatus of a network node, in accordance with the present disclosure. Example process 800 is an example where the apparatus or the network node (e.g., network node 110) performs operations associated with a smart repeater device.

As shown in FIG. 8, in some aspects, process 800 may include transmitting, to a repeater device, a detection configuration that is associated with autonomous detection of a transmission that is associated with a UE (block 810). For example, the network node (e.g., using transmission component 1004 and/or communication manager 1006, depicted in FIG. 10) may transmit, to a repeater device, a detection configuration that is associated with autonomous detection of a transmission that is associated with a UE, as described above.

As further shown in FIG. 8, in some aspects, process 800 may include receiving a detection indication that indicates detection of the transmission (block 820). For example, the network node (e.g., using reception component 1002 and/or communication manager 1006, depicted in FIG. 10) may receive a detection indication that indicates detection of the transmission, as described above.

Process 800 may include additional aspects, such as any single aspect or any combination of aspects described below and/or in connection with one or more other processes described elsewhere herein.

In a first aspect, the detection configuration indicates at least one of an air interface resource associated with the transmission, or UE ID information that is associated with the transmission.

In a second aspect, the transmission is an uplink transmission.

In a third aspect, the uplink transmission includes at least one of a PUCCH transmission, a PUSCH transmission, a cell switch request, or an initial uplink transmission associated with the UE.

In a fourth aspect, process 800 includes transmitting, to the repeater device, configuration information that includes at least one of a reference signal configuration, a CG PUSCH configuration, or an SPS PDSCH configuration.

In a fifth aspect, process 800 includes transmitting reference signal configuration information that is associated with the repeater device transmitting a reference signal.

In a sixth aspect, the reference signal configuration information indicates an air interface resource configuration associated with a reference signal.

In a seventh aspect, the reference signal configuration information indicates a codebook associated with a reference signal.

In an eighth aspect, the reference signal configuration information indicates a scrambling sequence associated with a reference signal.

In a ninth aspect, the transmission is associated with an LTM procedure.

In a tenth aspect, process 800 includes receiving, from the repeater device, a request for an uplink allocation that is assigned to the UE, and transmitting, to the repeater device, an allocation indication that indicates the uplink allocation, and receiving the detection indication is based at least in part on the uplink allocation.

In an eleventh aspect, the detection indication indicates at least one of a UE ID associated with a handover event, a UE group ID associated with the handover event, or a logical ID associated with the handover event.

In a twelfth aspect, process 800 includes transmitting an acknowledgement indication that indicates receipt of the detection indication.

In a thirteenth aspect, the network node is associated with a target cell of the UE.

In a fourteenth aspect, the network node is associated with a source cell of the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
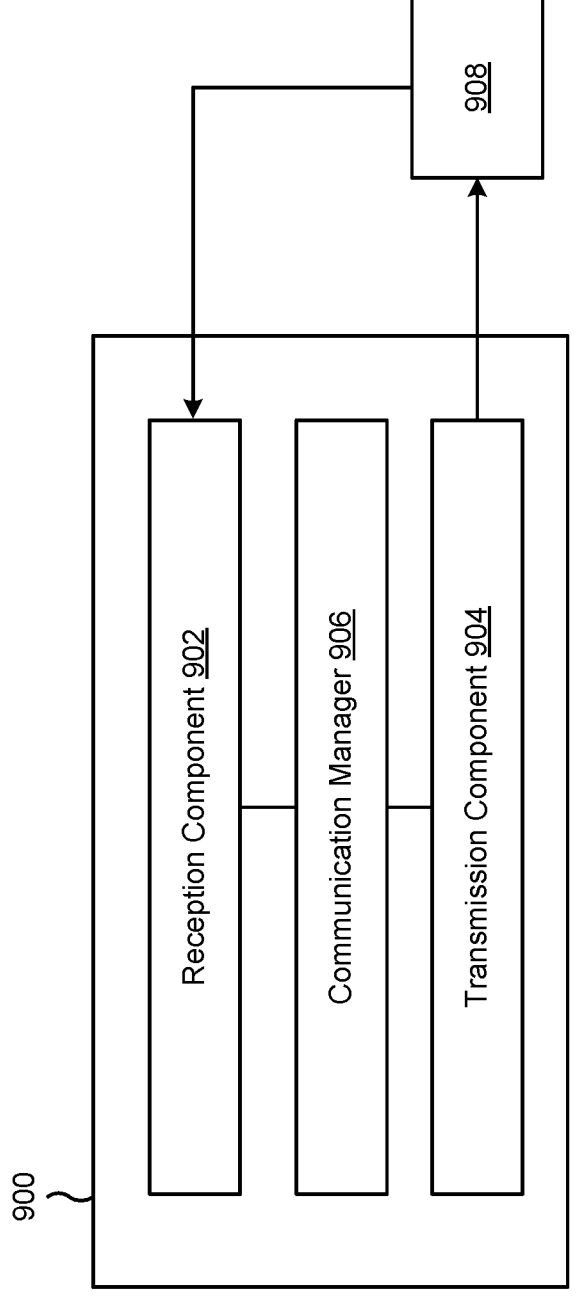
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a repeater device, or a repeater device may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 140 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 5-8. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the repeater device described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, one or more modems, one or more demodulators, one or more MIMO detectors, one or more receive processors, one or more controllers/processors, one or more memories, or a combination thereof, of the repeater device described in connection with FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, one or more modems, one or more modulators, one or more transmit MIMO processors, one or more transmit processors, one or more controllers/processors, one or more memories, or a combination thereof, of the repeater device described in connection with FIG. 2. In some aspects, the transmission component 904 may be co-located with the reception component 902 in one or more transceivers.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The reception component 902 may receive a detection configuration that is associated with autonomous detection of a transmission that is associated with a UE. The communication manager 906 may detect the transmission based at least in part on the detection configuration. The transmission component 904 may transmit a detection indication that is based at least in part on detecting the transmission. The communication manager 906 may detect an event trigger, and transmitting the detection indication is based at least in part on detecting the event trigger.

In some aspects, the communication manager 906 may detect that the transmission is an initial uplink transmission associated with the UE. The transmission component 904 may transmit an activation indication that is associated with a configuration assigned to the UE based at least in part on detecting that the transmission is the initial uplink transmission. Alternatively, or additionally, the communication manager 906 may relay at least one of a PUSCH transmission based at least in part on a CG PUSCH configuration, or a PDSCH transmission based at least in part on a SPS PDSCH configuration.

The reception component 902 may receive reference signal configuration information. In some aspects, the transmission component 904 may transmit a reference signal based at least in part on the reference signal configuration information. The communication manager 906 may select, autonomously, a codebook to use for transmitting the reference signal.

The communication manager 906 may detect that the transmission is an initial uplink transmission associated with the UE. In some aspects, the transmission component 904 may transmit, to a network node, a request for an uplink allocation. Alternatively, or additionally, the reception component 902 may receive, from the network node, an allocation indication that indicates the uplink allocation.

The communication manager 906 may delay one or more operations associated with the transmission. In some aspects, the reception component 902 may receive an acknowledgement indication that is associated with the detection indication. The communication manager 906 may perform, based at least in part on receiving the acknowledgement indication, the one or more delayed operations.

The communication manager 906 may detect that the transmission is associated with an LTM procedure associated with the UE. Alternatively, or additionally, the communication manager 906 may delay one or more operations associated with the transmission. In some aspects, the reception component 902 may receive, from the source network node, an acknowledgement indication that is associated with the detection indication. The communication manager 906 may perform, based at least in part on receiving the acknowledgement indication, the one or more delayed operations.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
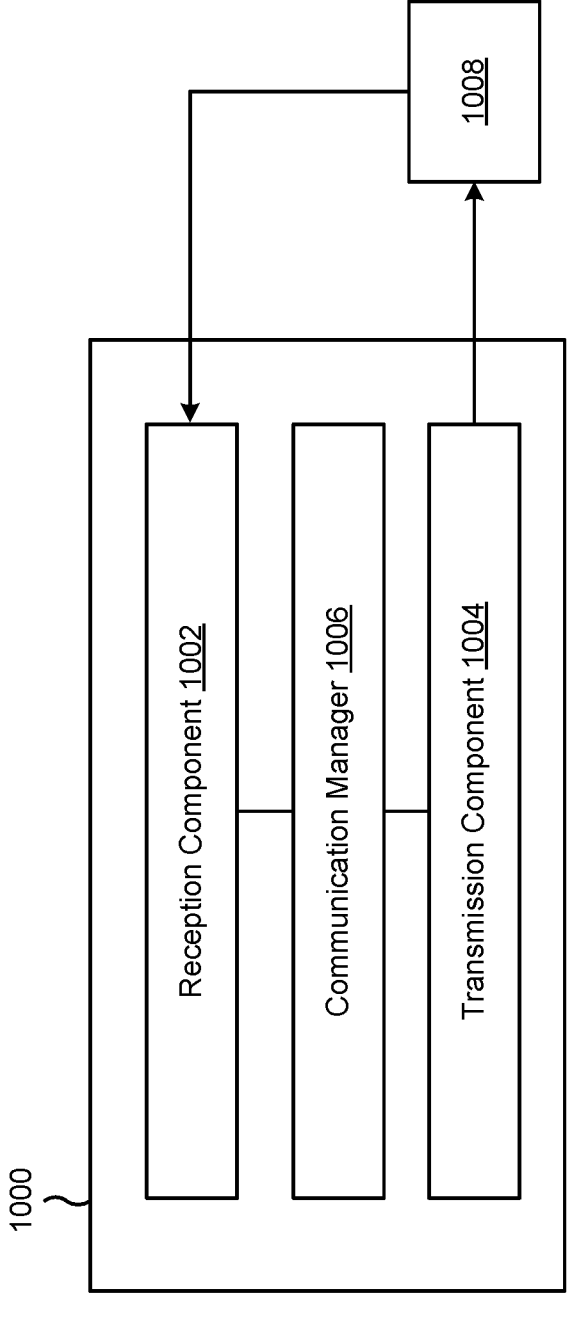
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 150 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 5-8. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1002 and/or the transmission component 1004 may include or may be included in a network interface. The network interface may be configured to obtain and/or output signals for the apparatus 1000 via one or more communications links, such as a backhaul link, a midhaul link, and/or a fronthaul link.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1004 may be co-located with the reception component 1002 in one or more transceivers.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The transmission component 1004 may transmit, to a repeater device, a detection configuration that is associated with autonomous detection of a transmission that is associated with a UE. The reception component 1002 may receive a detection indication that indicates detection of the transmission.

The transmission component 1004 may transmit, to the repeater device, configuration information that includes at least one of a reference signal configuration, a CG PUSCH configuration, or an SPS PDSCH configuration. Alternatively, or additionally, the transmission component 1004 may transmit reference signal configuration information that is associated with the repeater device transmitting a reference signal.

The reception component 1002 may receive, from the repeater device, a request for an uplink allocation that is assigned to the UE. In some aspects, the transmission component 1004 may transmit, to the repeater device, an allocation indication that indicates the uplink allocation and receiving the detection indication is based at least in part on the uplink allocation.

The transmission component 1004 may transmit an acknowledgement indication that indicates receipt of the detection indication.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a repeater device, comprising: receiving a detection configuration that is associated with autonomous detection of a transmission that is associated with a user equipment (UE); detecting the transmission based at least in part on the detection configuration; and transmitting a detection indication that is based at least in part on detecting the transmission.

Aspect 2: The method of Aspect 1, wherein detecting the transmission comprises: detecting the transmission based at least in part on at least one of: energy detection, sequence detection, or uplink decoding.

Aspect 3: The method of any of Aspects 1-2, wherein the detection configuration indicates at least one of: an air interface resource associated with the transmission, or UE identifier (ID) information that is associated with the transmission.

Aspect 4: The method of any of Aspects 1-3, wherein the transmission is an uplink transmission.

Aspect 5: The method of Aspect 4, wherein the uplink transmission comprises at least one of: a physical uplink control channel (PUCCH) transmission, a physical uplink shared channel (PUSCH) transmission, a cell switch request, or an initial uplink transmission associated with the UE.

Aspect 6: The method of any of Aspects 1-5, wherein transmitting the detection indication comprises: relaying the transmission.

Aspect 7: The method of any of Aspects 1-6, further comprising: detecting an event trigger, wherein transmitting the detection indication is based at least in part on detecting the event trigger.

Aspect 8: The method of any of Aspects 1-7, further comprising: detecting that the transmission is an initial uplink transmission associated with the UE; and transmitting an activation indication that is associated with a configuration assigned to the UE.

Aspect 9: The method of Aspect 8, wherein the configuration comprises at least one of: a reference signal configuration, a configured grant (CG) physical uplink shared channel (PUSCH) configuration, or a semi-persistent scheduling (SPS) physical downlink shared channel (PDSCH) configuration.

Aspect 10: The method of Aspect 9, further comprising: relaying at least one of: a PUSCH transmission based at least in part on the CG PUSCH configuration, or a PDSCH transmission based at least in part on the SPS PDSCH configuration.

Aspect 11: The method of any of Aspects 1-10, further comprising: receiving reference signal configuration information; and transmitting a reference signal based at least in part on the reference signal configuration information.

Aspect 12: The method of Aspect 11, wherein the reference signal configuration information indicates an air interface resource configuration associated with the reference signal.

Aspect 13: The method of Aspect 11 or Aspect 12, wherein the reference signal configuration information indicates a codebook associated with the reference signal.

Aspect 14: The method of any of Aspects 11-13, further comprising: selecting, autonomously, a codebook to use for transmitting the reference signal.

Aspect 15: The method of any of Aspects 11-14, wherein the reference signal configuration information indicates a scrambling sequence associated with the reference signal.

Aspect 16: The method of any of Aspects 1-15, wherein the transmission is associated with a Layer 1/Layer 2 triggered mobility (LTM) procedure.

Aspect 17: The method of any of Aspects 1-16, further comprising: detecting that the transmission is an initial uplink transmission associated with the UE; transmitting, to a network node, a request for an uplink allocation; and receiving, from the network node, an allocation indication that indicates the uplink allocation.

Aspect 18: The method of Aspect 17, wherein transmitting the detection indication is based at least in part on the uplink allocation.

Aspect 19: The method of Aspect 17 or Aspect 18, wherein the network node is associated with a target cell of the UE.

Aspect 20: The method of any of Aspects 1-19, wherein the detection indication indicates at least one of: a UE identifier (ID) associated with a handover event, a UE group ID associated with the handover event, or a logical ID associated with the handover event.

Aspect 21: The method of any of Aspects 1-20, further comprising: delaying one or more operations associated with the transmission; receiving an acknowledgement indication that is associated with the detection indication; and performing, based at least in part on receiving the acknowledgement indication, the one or more delayed operations.

Aspect 22: The method of any of Aspects 1-21, further comprising: detecting that the transmission is associated with a Layer 1/Layer 2 triggered mobility (LTM) procedure associated with the UE, wherein transmitting the detection indication comprises: transmitting the detection indication to a source network node associated with the UE based at least in part on detecting that the transmission is associated with the LTM procedure, wherein transmitting the detection indication comprises: transmitting the detection indication to a source network node associated with the UE based at least in part on detecting that the transmission is associated with the LTM procedure.

Aspect 23: The method of Aspect 22, further comprising: delaying one or more operations associated with the transmission; receiving, from the source network node, an acknowledgement indication that is associated with the detection indication; and performing, based at least in part on receiving the acknowledgement indication, the one or more delayed operations.

Aspect 24: A method of wireless communication performed by a network node, comprising: transmitting, to a repeater device, a detection configuration that is associated with autonomous detection of a transmission that is associated with a user equipment (UE); and receiving a detection indication that indicates detection of the transmission.

Aspect 25: The method of Aspect 24, wherein the detection configuration indicates at least one of: an air interface resource associated with the transmission, or UE identifier (ID) information that is associated with the transmission.

Aspect 26: The method of any of Aspects 24-25, wherein the transmission is an uplink transmission.

Aspect 27: The method of Aspect 26, wherein the uplink transmission comprises at least one of: a physical uplink control channel (PUCCH) transmission, a physical uplink shared channel (PUSCH) transmission, a cell switch request, or an initial uplink transmission associated with the UE.

Aspect 28: The method of any of Aspects 24-27, further comprising: transmitting, to the repeater device, configuration information that comprises at least one of: a reference signal configuration, a configured grant (CG) physical uplink shared channel (PUSCH) configuration, or a semi-persistent scheduling (SPS) physical downlink shared channel (PDSCH) configuration.

Aspect 29: The method of any of Aspects 24-28, further comprising: transmitting reference signal configuration information that is associated with the repeater device transmitting a reference signal.

Aspect 30: The method of Aspect 29, wherein the reference signal configuration information indicates an air interface resource configuration associated with a reference signal.

Aspect 31: The method of Aspect 29 or Aspect 30, wherein the reference signal configuration information indicates a codebook associated with a reference signal.

Aspect 32: The method of any of Aspects 29-31, wherein the reference signal configuration information indicates a scrambling sequence associated with a reference signal.

Aspect 33: The method of any of Aspects 24-32, wherein the transmission is associated with a Layer 1/Layer 2 triggered mobility (LTM) procedure.

Aspect 34: The method of any of Aspects 24-33, further comprising: receiving, from the repeater device, a request for an uplink allocation that is assigned to the UE; and transmitting, to the repeater device, an allocation indication that indicates the uplink allocation, wherein receiving the detection indication is based at least in part on the uplink allocation.

Aspect 35: The method of any of Aspects 24-34, wherein the detection indication indicates at least one of: a UE identifier (ID) associated with a handover event, a UE group ID associated with the handover event, or a logical ID associated with the handover event.

Aspect 36: The method of any of Aspects 24-35, further comprising: transmitting an acknowledgement indication that indicates receipt of the detection indication.

Aspect 37: The method of Aspect 36, wherein the network node is associated with a target cell of the UE.

Aspect 38: The method of Aspect 36, wherein the network node is associated with a source cell of the UE.

Aspect 39: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-23.

Aspect 40: An apparatus for wireless communication at a device, the apparatus comprising one or more memories and one or more processors coupled to the one or more memories, the one or more processors configured to cause the device to perform the method of one or more of Aspects 1-23.

Aspect 41: An apparatus for wireless communication, the apparatus comprising at least one means for performing the method of one or more of Aspects 1-23.

Aspect 42: A non-transitory computer-readable medium storing code for wireless communication, the code comprising instructions executable by one or more processors to perform the method of one or more of Aspects 1-23.

Aspect 43: A non-transitory computer-readable medium storing a set of instructions for wireless communication, the set of instructions comprising one or more instructions that, when executed by one or more processors of a device, cause the device to perform the method of one or more of Aspects 1-23.

Aspect 44: A device for wireless communication, the device comprising a processing system that includes one or more processors and one or more memories coupled with the one or more processors, the processing system configured to cause the device to perform the method of one or more of Aspects 1-23.

Aspect 45: An apparatus for wireless communication at a device, the apparatus comprising one or more memories and one or more processors coupled to the one or more memories, the one or more processors individually or collectively configured to cause the device to perform the method of one or more of Aspects 1-23.

Aspect 46: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 24-38.

Aspect 47: An apparatus for wireless communication at a device, the apparatus comprising one or more memories and one or more processors coupled to the one or more memories, the one or more processors configured to cause the device to perform the method of one or more of Aspects 24-38.

Aspect 48: An apparatus for wireless communication, the apparatus comprising at least one means for performing the method of one or more of Aspects 24-38.

Aspect 49: A non-transitory computer-readable medium storing code for wireless communication, the code comprising instructions executable by one or more processors to perform the method of one or more of Aspects 24-38.

Aspect 50: A non-transitory computer-readable medium storing a set of instructions for wireless communication, the set of instructions comprising one or more instructions that, when executed by one or more processors of a device, cause the device to perform the method of one or more of Aspects 24-38.

Aspect 51: A device for wireless communication, the device comprising a processing system that includes one or more processors and one or more memories coupled with the one or more processors, the processing system configured to cause the device to perform the method of one or more of Aspects 24-38.

Aspect 52: An apparatus for wireless communication at a device, the apparatus comprising one or more memories and one or more processors coupled to the one or more memories, the one or more processors individually or collectively configured to cause the device to perform the method of one or more of Aspects 24-38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a repeater device, comprising:

one or more memories; and one or more processors, coupled to the one or more memories, configured, individually or collectively, to cause the repeater device to:

receive a detection configuration that is associated with autonomous detection of a transmission that is associated with a user equipment (UE);

detect the transmission based at least in part on the detection configuration;

detect that the transmission is associated with a Layer 1/Layer 2 triggered mobility (LTM) procedure associated with the UE; and transmit, to a source network node associated with the UE and based at least in part on detecting that the transmission is associated with the LTM procedure, a detection indication that is based at least in part on detecting the transmission.

2. The apparatus of claim 1, wherein the detection configuration indicates at least one of:

an air interface resource associated with the transmission, or

UE identifier (ID) information that is associated with the transmission.

3. The apparatus of claim 1, wherein the transmission is an uplink transmission that comprises at least one of:

a physical uplink control channel (PUCCH) transmission, a physical uplink shared channel (PUSCH) transmission, a cell switch request, or an initial uplink transmission associated with the UE.

4. The apparatus of claim 1, wherein the one or more processors are further configured to cause the repeater device to:

detect that the transmission is an initial uplink transmission associated with the UE; and transmit an activation indication that is associated with a configuration assigned to the UE.

5. The apparatus of claim 4, wherein the configuration comprises at least one of:

a reference signal configuration, a configured grant (CG) physical uplink shared channel (PUSCH) configuration, or a semi-persistent scheduling (SPS) physical downlink shared channel (PDSCH) configuration.

6. The apparatus of claim 5, wherein the one or more processors are further configured to cause the repeater device to:

relay at least one of:

a PUSCH transmission based at least in part on the CG PUSCH configuration, or a PDSCH transmission based at least in part on the SPS PDSCH configuration.

7. The apparatus of claim 1, wherein the one or more processors are further configured to cause the repeater device to:

receive reference signal configuration information; and transmit a reference signal based at least in part on the reference signal configuration information.

8. The apparatus of claim 1, wherein the transmission is associated with a Layer 1/Layer 2 triggered mobility (LTM) procedure.

9. The apparatus of claim 1, wherein the one or more processors are further configured to cause the repeater device to:

detect that the transmission is an initial uplink transmission associated with the UE;

transmit, to a network node, a request for an uplink allocation; and receive, from the network node, an allocation indication that indicates the uplink allocation.

10. The apparatus of claim 1, wherein the one or more processors are further configured to cause the repeater device to:

delay one or more operations associated with the transmission;

receive, from the source network node, an acknowledgement indication that is associated with the detection indication; and perform, based at least in part on receiving the acknowledgement indication, the one or more delayed operations.

11. A method of wireless communication performed by a repeater device, comprising:

receiving a detection configuration that is associated with autonomous detection of a transmission that is associated with a user equipment (UE);

detecting the transmission based at least in part on the detection configuration;

detecting that the transmission is associated with a Layer 1/Layer 2 triggered mobility (LTM) procedure associated with the UE; and transmitting, to a source network node associated with the UE and based at least in part on detecting that the transmission is associated with the LTM procedure, a detection indication that is based at least in part on detecting the transmission.

12. The method of claim 11, further comprising:

detecting that the transmission is an initial uplink transmission associated with the UE; and transmitting an activation indication that is associated with a configuration assigned to the UE.

13. The method of claim 11, further comprising:

receiving reference signal configuration information; and transmitting a reference signal based at least in part on the reference signal configuration information.

14. The method of claim 11, further comprising:

detecting that the transmission is an initial uplink transmission associated with the UE;

transmitting, to a network node, a request for an uplink allocation; and receiving, from the network node, an allocation indication that indicates the uplink allocation.

15. The method of claim 11, further comprising:

delaying one or more operations associated with the transmission;

receiving, from the source network node, an acknowledgement indication that is associated with the detection indication; and performing, based at least in part on receiving the acknowledgement indication, the one or more delayed operations.

* * * * *